(12) United States Patent
Shao et al.

(10) Patent No.: US 8,508,242 B2
(45) Date of Patent: Aug. 13, 2013

(54) INDUCTIVE POSITION SENSOR

(75) Inventors: Lingmin Shao, Ridgetown (CA); Joong K. Lee, Chatham (CA); Ryan W. Elliott, Chatham (CA)

(73) Assignee: KSR Technologies Co., Ridgetown (CA)

( * ) Notice: Subject to any disclaimer, the term of this patent is extended or adjusted under 35 U.S.C. 154(b) by 275 days.

(21) Appl. No.: 13/011,949

(22) Filed: Jan. 24, 2011

(65) Prior Publication Data

US 2011/0181302 A1  Jul. 28, 2011

Related U.S. Application Data

(60) Provisional application No. 61/297,841, filed on Jan. 25, 2010.

(51) Int. Cl.
*G01B 7/14* (2006.01)
*G01R 33/02* (2006.01)

(52) U.S. Cl.
USPC .................. 324/654; 324/207.15; 324/256

(58) Field of Classification Search
USPC ............... 324/654, 750.16, 555, 256, 257, 324/546, 343, 207.13–209.19; 702/150, 702/151, 94, 95; 340/456, 686.1; 73/861.78, 73/1.79, 634, 114.26, 314, 54.33, 505.03, 73/514.02, 1.75
See application file for complete search history.

(56) References Cited

U.S. PATENT DOCUMENTS

| | | |
|---|---|---|
| 5,351,573 A | 10/1994 | Cicotte |
| 5,771,752 A | 6/1998 | Cicotte |
| 5,823,064 A | 10/1998 | Cicotte |
| 6,151,986 A | 11/2000 | Willemsen et al. |
| 6,178,847 B1 | 1/2001 | Willemsen et al. |
| 6,389,927 B1 | 5/2002 | Willemsen |
| 6,453,767 B1 | 9/2002 | Willemsen et al. |
| 6,499,376 B2 | 12/2002 | Thistleton et al. |
| 6,571,900 B2 | 6/2003 | Thistleton |
| 6,584,871 B2 | 7/2003 | Burton et al. |
| 6,655,231 B2 | 12/2003 | Willemsen |
| 6,792,827 B2 | 9/2004 | Willemsen |
| 6,862,950 B2 | 3/2005 | O'Neill |
| 6,889,575 B2 | 5/2005 | Thistleton et al. |
| 6,918,318 B2 | 7/2005 | Willemsen |
| 6,962,095 B2 | 11/2005 | Winfield |
| 6,983,671 B2 | 1/2006 | White |
| 7,051,613 B2 | 5/2006 | Burton et al. |
| 7,114,411 B2 | 10/2006 | Willemsen |

(Continued)

FOREIGN PATENT DOCUMENTS

WO  WO-2009/037561 A2  3/2009

*Primary Examiner* — Jermele M Hollington
*Assistant Examiner* — Farhana Hoque
(74) *Attorney, Agent, or Firm* — Gifford, Krass, Sprinkle, Anderson & Citkowski, P.C.

(57) ABSTRACT

A rotary position sensor having a transmitter coil energized by a high frequency current source. A first receiver coil includes an even number N of loops wherein adjacent loops of the first receiver coil are oppositely wound. A second receiver coil also includes N loops where adjacent loops are oppositely wound. Furthermore, the second receiver coil is angularly offset from the first receiver coil by 180/N degrees. A noncircular coupler constructed of an electrically conductive material is rotatably mounted relative to the coils so that the coupler element overlies at least a portion of the first and second receiver coils. A circuit processes the output signals from the first and second receiver coils and generates an output signal representative of the rotational position of the coupler.

6 Claims, 2 Drawing Sheets

(56) References Cited

U.S. PATENT DOCUMENTS

| Patent No. | Date | Inventor(s) | Ref |
|---|---|---|---|
| 7,146,876 B2 | 12/2006 | Willemsen et al. | |
| 7,191,759 B2 | 3/2007 | Lee | |
| 7,216,563 B2 | 5/2007 | Willemsen et al. | |
| 7,221,154 B2 | 5/2007 | Lee | |
| 7,228,759 B2 | 6/2007 | Jagger et al. | |
| 7,276,897 B2 | 10/2007 | Lee | |
| 7,292,026 B2 | 11/2007 | Lee | |
| 7,337,692 B2 | 3/2008 | Willemsen et al. | |
| 7,345,473 B2 | 3/2008 | Lee | |
| 7,353,729 B2 | 4/2008 | Willemsen et al. | |
| 7,370,555 B2 | 5/2008 | Willemsen et al. | |
| 7,449,878 B2 | 11/2008 | Lee | |
| 7,482,803 B2 | 1/2009 | Lee et al. | |
| 7,530,289 B2 | 5/2009 | Willemsen et al. | |
| 7,538,544 B2 | 5/2009 | Lee | |
| 7,562,591 B2 | 7/2009 | Lee | |
| 7,821,256 B2 | 10/2010 | Lee | |
| 7,823,442 B2 | 11/2010 | O'Neill | |
| 7,823,480 B2 | 11/2010 | O'Neill et al. | |
| 7,906,960 B2 | 3/2011 | Lee | |
| 7,911,354 B2 | 3/2011 | Kim | |
| 2006/0081070 A1 | 4/2006 | Madni et al. | |
| 2007/0001666 A1* | 1/2007 | Lee | 324/207.15 |
| 2008/0174302 A1* | 7/2008 | Lee et al. | 324/207.16 |
| 2008/0231265 A1* | 9/2008 | Hayashi et al. | 324/207.23 |

* cited by examiner

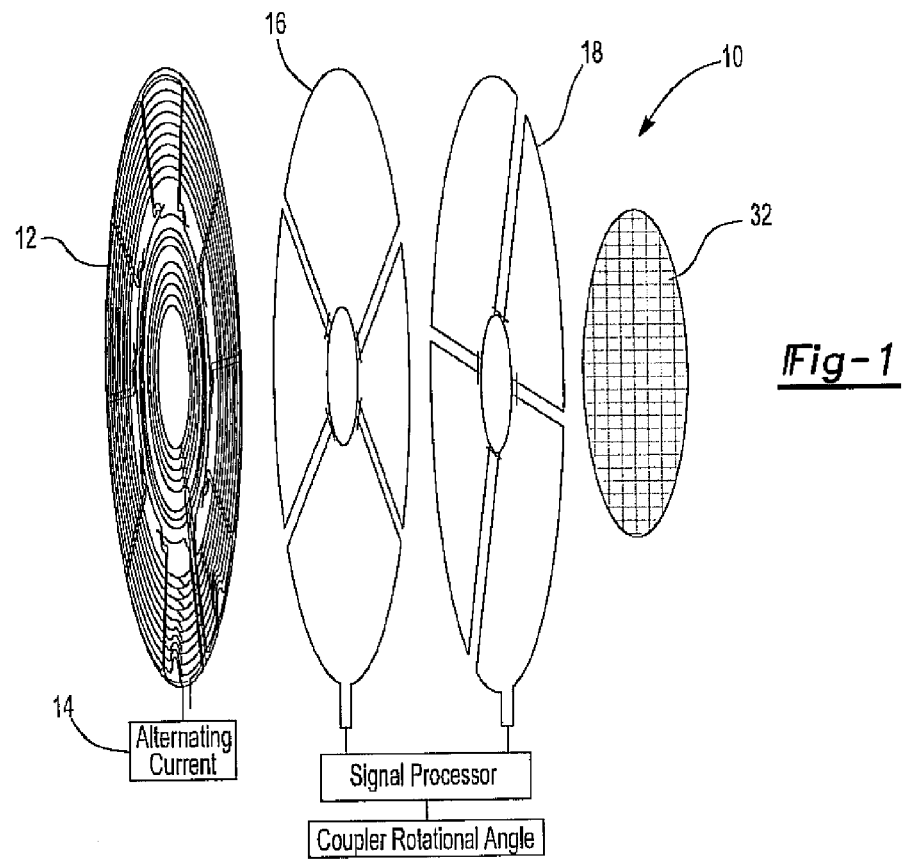
*Fig-1*
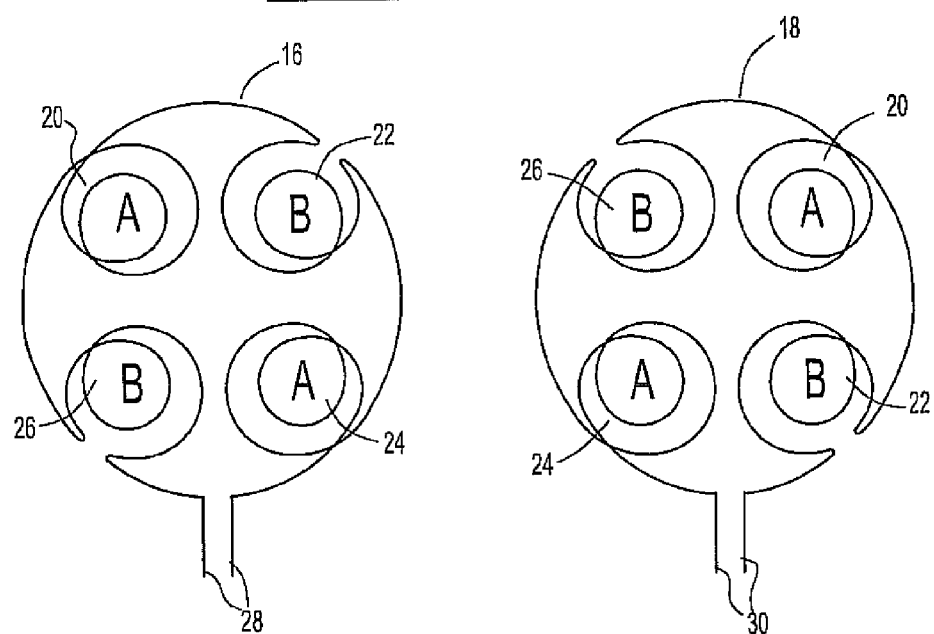
*Fig-2A*   *Fig-2B*

INDUCTIVE POSITION SENSOR

CROSS-REFERENCE TO RELATED APPLICATION

This application claims priority of U.S. Provisional Patent Application Ser. No. 61/297,841 filed Jan. 25, 2010, which is incorporated herein by reference.

BACKGROUND OF THE INVENTION

I. Field of the Invention

The present invention relates generally to rotary sensors.

II. Description of Related Art

In automotive vehicles, the throttle pedal has traditionally been mechanically connected to the engine throttle by a cable. In more modern vehicles, however, a throttle position sensor is mechanically connected to the pedal and generates an electrical signal indicative of the degree of depression of the throttle pedal. Such systems are sometimes termed "fly by wire" systems.

In one type of previously known throttle position sensor, the sensor includes a transmitter or exciter coil that is excited by a high frequency source and generates electromagnetic radiation at the frequency of the high frequency source. This transmitter coil, furthermore, is typically arranged in a circular pattern although other pattern configurations may alternatively be used.

A receiver coil is also disposed in the throttle position sensor adjacent the transmitter coil. Consequently, the receiver coil generates a receiver signal when the transmitter coil is excited due to inductive coupling between the receiver and the transmitter coil.

Unlike the transmitter coil, however, the receiver coil includes at least a first and second loop that are oppositely wound with respect to each other when viewed in plan. Consequently, the inductive coupling between the transmitter coil and the first loop of the receiver coil generates a voltage opposite in polarity from the inductive coupling between the transmitter coil and the second loop of the receiver coil. The loops of the receiver coil are connected in series so that the receiver output signal is a combination or sum of the signals from the first and second loops of the receiver coil.

In order to generate an output signal representative of the position of the throttle, a coupler element is rotatably mounted within the throttle position sensor so that the coupler element rotates in synchronism with the depression and release of the throttle pedal. This coupler element, furthermore, overlies a portion of both the transmitter and the receiver coils. The coupler element is constructed of a conductive material which cancels magnetic flux through the generation of eddy currents within the coupler element. Consequently, upon rotation of the coupler, the inductive coupling between the transmitter and the first and second loops of the receiver coil are varied thus producing a voltage output from the overall receiver coil indicative of the angular position of the coupler, and thus the position of the throttle pedal.

Assuming that the coupling element is precisely concentric with the transmitter and receiver coil, and that the space in between the coupler element and the transmitter and receiver coils remains constant during the entire movement of the coupler element, the output from the receiver coil provides a precise indication of the angular position of the coupler element, and thus the position of the throttle pedal. In practice, however, manufacturing tolerances during the manufacture of the throttle position sensor oftentimes produce a throttle position sensor in which the coupler element is not precisely concentric with the transmitter and receiver coils and/or the coupler element does not maintain an even spacing between the coupler element and the transmitter and receiver coils during the entire pivotal or rotational movement of the coupler element. Any lack of concentricity of the coupler element with the transmitter and receiver coils, as well as a variation in the space in between the coupler element and the receiver coils during rotation or pivoting of the coupler element, will vary the inductive coupling between the transmitter coil and the first and second loops of the receiver coil which, in turn, provides an output signal from the receiver coil which varies from the throttle position sensor with a precisely positioned coupler element at the same angular position.

SUMMARY OF THE PRESENT INVENTION

The present invention provides a throttle position sensor which overcomes the above-mentioned problems of the previously known throttle position sensors.

In brief, the throttle position sensor of the present invention includes a transmitter coil which is preferably wound in a circular configuration having a plurality of loops. The receiver coil is excited by a high frequency alternating current source so that, when energized, the transmitter coil generates electromagnetic radiation. The transmitter coil, furthermore, is typically printed on a printed circuit board.

A first receiver coil is also printed on the printed circuit board adjacent the transmitter coil. The receiver coil includes at least two and preferably four or more distinct coil sections that are electrically coupled in series with each other. For a four distinct coil section, the receiver coil would include four distinct loops wherein the alternating loops each occupy ninety degrees of the circle and in which alternating loops are oppositely wound from each other. All of the loops, however, are electrically connected in series with each other so that the overall electrical output from the receiver coil consists of the sum of the induced voltage on all of the loops of the receiver coil. Consequently, since the alternating loops are oppositely wound from each other, assuming an identical inductive coupling between the transmitter coil and each of the four loops, the output on the receiver coil would be zero.

A second receiving coil is also formed on the printed circuit board which is identical in shape with the first receiver coil, but rotated 45 degrees or 180/N where N equals the number of loops in the receiver coil.

As with the previously known throttle position sensors, a coupler element is movably positioned relative to both the transmitter and both receiver coils. This coupler element varies the inductive coupling between the transmitter coil and both the first and second receiver coils as a function of the angular position of the coupler element. Since the coupler element is mechanically coupled to the throttle pedal, the rotational position of the coupler element directly corresponds to the position of the throttle pedal.

The coupler element, furthermore, is configured so that rotational movement of the coupler element will cause the voltage induced on the first receiver coil to vary as a sine function. However, since the second receiver coil is effectively rotated 90 degrees relative to the first receiver coil, the electrical output produced on the second receiver coil during rotation of the coupler element varies as a cosine function. Consequently, the angular position of the coupler element, and thus the actual position of the throttle pedal, may be accurately determined by solving the arc tangent function of the sine and cosine output signals from the first and second receiver coils, respectively.

A primary advantage of the present invention is that the sensed angle from both the first and second receiver coils is insensitive to variation of the throttle position sensor such as air gap between the coupler element and the receiver coils, temperature, and the like since both the sine and cosine signals from the first and second receiver coils, respectively, will be scaled by the same factor.

BRIEF DESCRIPTION OF THE DRAWING

A better understanding of the present invention will be had upon reference to the following detailed description when read in conjunction with the accompanying drawing, wherein like reference characters refer to like parts throughout the several views, and in which:

FIG. 1 is an exploded diagrammatic view illustrating a preferred embodiment of the present invention;

FIGS. 2A and 2B are plan views illustrating a first and second receiving coil;

DETAILED DESCRIPTION OF A PREFERRED EMBODIMENT OF THE PRESENT INVENTION

Figure 3:
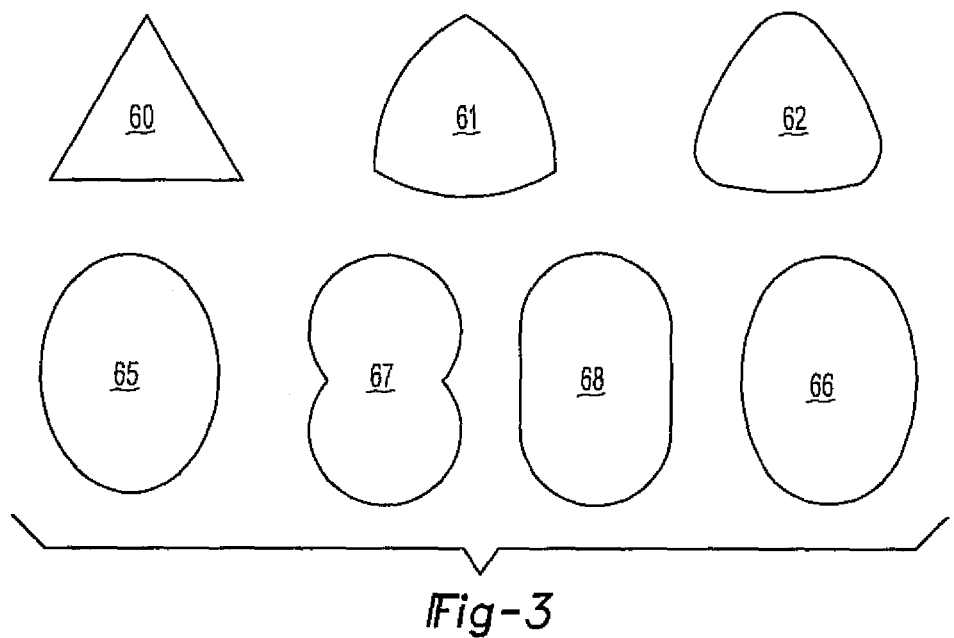
FIG. 3 is a view illustrating alternate shapes for the coupling element.

With reference first to FIG. 1, an exploded view of a throttle position sensor 10 in accordance with the present invention is illustrated. The throttle position sensor 10 includes a transmitting coil 12 which preferably comprises a plurality of circular loops of conductive material which are coupled to a high frequency alternating current source 14. The transmitter coil 12 is preferably printed on a printed circuit board so that, when energized by the high frequency alternating current source 14, the transmitting coil 12 generates a high frequency electromagnetic field.

With reference now to FIGS. 1, 2A and 2B, the throttle position sensor also includes a first receiving coil 16 as well as a second receiving coil 18. Both the first and second receiving coils 16 and 18, furthermore, are also printed on the printed circuit board and are generally aligned with the transmitter coil 12.

As best shown in FIG. 2A, the first receiver coil 16 includes four separate loops 20, 22, 24 and 26. Each loop 20-26 occupies 90 degrees of the overall circle of the first receiver coil 16. However, adjacent loops 20-26 are oppositely wound from each other.

For example, assuming that the loop 20 of the first receiver coil 16 is wound in a clockwise direction as viewed in plan, the loop 22 is wound in a counterclockwise direction, the loop 24 is wound in a clockwise direction, and the loop 26 is wound in a counterclockwise direction. Each loop 20-26, however, is connected in series with each other so that a single two-wire output 28 is provided from the receiver coil 16.

Since the adjacent loops 20-26 in the receiver coil 16 are wound in opposite directions, the induced voltage on these loops 20-26 upon energization of the transmitter coil will be in opposite voltage. Thus, if the inductive coupling between the transmitter coil 12 and all four loops 20-26 are identical, the voltage on the outputs 28 of the first receiver coil 16 would be zero.

The second receiver coil 18 is substantially identical to the first receiver coil 16, except that the second receiver coil 18 is rotated 45 degrees or 180/N degrees where N equals the number of loops 20-26. All of the loops 20-26 of the second receiver coil 18, like the first receiver coil 16, are electrically connected in series with each other so that the voltage output on the output 30 from the second receiver coil equals the sum of the induced voltage on all four loops 20-26 of the second receiver coil 18.

Like the previously known throttle position sensors, a coupler element 32 (FIG. 1) is concentric with both the receiver coils 16 and 18 and transmitter coil 12. The coupler element 32, furthermore, is constructed of a conductive material so that energization of the transmitter coil 12 will create eddy currents within the coupler element 32 and thus affect the inductive coupling between the transmitter coil 12 and the two receiver coils 16 and 18. As shown in FIG. 3, the actual shape of the coupler element 32 will vary depending upon the number of loops in the receiver coils.

For example, the coupler element 32 may have a generally triangular shape as shown at 60, 61 and 62 in FIG. 3. Such a generally triangular coupler element 60-62 would be used, for example, where both the first and second receiver coils had three lobes.

Alternatively, the coupler element 32 may be generally oval in shape as shown at 65 and 66 in FIG. 3. Such a coupler element would be used where each receiving coil included four lobes. Still other shapes for the coupler element 32 are shown in FIG. 3 at 67 and 68.

The coupler element 32 is mechanically connected to the throttle position so that the rotational position of the coupler element 32 varies proportionally with the depression of the throttle pedal. Consequently, depression of the throttle pedal will rotate the coupler element 32 and vary the induced voltage in the loops 20-26 of both the first receiver coil 16 and second receiver coil 18.

More particularly, the induced voltage on the output 28 from the first receiver coil 16 will vary as a sine function as the coupler element 32 is rotated in a clockwise direction. Conversely, since the second receiver coil 18 is effectively rotated 90 degrees from the first receiver coil 16, the induced voltage on the output 30 from the second receiver coil 18 will vary as a cosine function of the rotational angle of the coupler element.

Consequently, in order to obtain the rotational angle of the coupler element, and thus the position of the throttle pedal, it is necessary to take the arc tangent of both the sine and cosine functions on the outputs 28 and 30 from the first and second receiver coils 16 and 18, respectively. This arc tangent function is given as follows:

$$\partial = \frac{a\tan2(y, x)}{N},$$

$$a\tan2(y, x) = 2\arctan\left(\frac{y}{\sqrt{x^2+y^2} + x}\right)$$

A primary advantage of the present invention is that any inaccuracies of the induced voltage on either the first or second receiver coils 16 or 18 caused by variations in the air gap between the coils and the coupler element, temperature, humidity, and the like will be scaled by the same error factor for both the sine function and the cosine function. Consequently, any such error due to environmental conditions or manufacturing tolerances is automatically compensated for and canceled out.

Figure 4A:
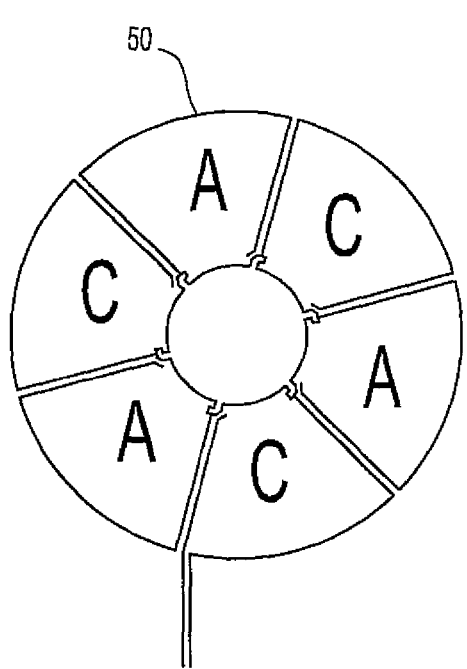
FIGS. 4A and 4B are views similar to FIGS. 2A and 2B, but illustrating modifications thereof.
Figure 4B:
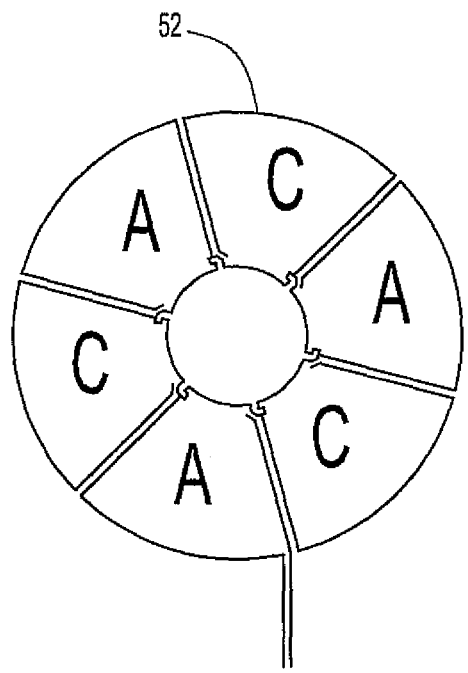

Although the present invention has been described as a throttle position sensor having a pair of receiving coils, each having four receiving loops, the receiving coils can have any even number of receiving loops. For example, a first receiving coil 50 and a second receiving coil 52, each having six separate loops, are illustrated in FIG. 4A and FIG. 4B, respectively.

Having described our invention, many modifications thereto will become apparent to those skilled in the art to which it pertains without deviation from the spirit of the invention as defined by the scope of the appended claims.

We claim:

1. A rotary position sensor comprising:
    a transmitter coil adapted to be energized by a high frequency current source,
    a first receiver coil adjacent said transmitter coil and concentrically arranged about an axis, said first receiver coil having an even number N of loops wherein adjacent loops of the first receiver coil are oppositely wound,
    a second receiver coil separate from the first receiver coil and adjacent said transmitter coil and concentrically arranged about said axis, said second receiver coil having number N loops wherein adjacent loops of the second receiver coil are oppositely wound, wherein said second receiver coil is angularly offset from said first receiver coil by 180/N degrees,
    a noncircular coupler constructed of an electrically conductive material rotatably mounted about said axis so that said coupler overlies at least a portion of said first and second receiver coils so that one of said receiver coils generates a sine function upon rotation of said coupler and the other of said receiver coils generates a cosine function upon rotation of said coupler,
    a circuit which processes output signals from both said first and second receiver coils and generates an output signal representative of the rotational position of said coupler,
    wherein said circuit computes the arctangent of the output signal from said first and second receiver coils.

2. The sensor as defined in claim 1 wherein said transmitter coil is concentrically wound around said first and second receiver coils.

3. The sensor as defined in claim 1 wherein N equals four.

4. The invention as defined in claim 3 wherein said coupler is oval in shape.

5. The sensor as defined in claim 1 wherein N equals six.

6. The invention as defined in claim 5 wherein said coupler is triangular in shape.

\* \* \* \* \*